United States Patent [19]

Berry

[11] Patent Number: 4,964,163
[45] Date of Patent: Oct. 16, 1990

[54] METHOD AND APPARATUS FOR CONTROLLING ACCESS TO A COMMUNICATION SYSTEM

[75] Inventor: Thomas G. Berry, Schaumburg, Ill.

[73] Assignee: Motorola, Inc., Schaumburg, Ill.

[21] Appl. No.: 177,559

[22] Filed: Apr. 4, 1988

[51] Int. Cl.⁵ .............................. H04L 9/00
[52] U.S. Cl. ....................... 380/23; 380/25; 380/49
[58] Field of Search ............. 380/23, 24, 25, 49

[56] References Cited

U.S. PATENT DOCUMENTS

| | | | |
|---|---|---|---|
| 4,193,131 | 3/1980 | Lennon et al. | 380/25 |
| 4,295,039 | 10/1981 | Stuckert | 235/380 |
| 4,348,696 | 9/1982 | Beier | 358/188 |
| 4,349,695 | 9/1982 | Morgan et al. | 380/25 |
| 4,445,712 | 5/1984 | Smagala-Romanoff | 283/75 |
| 4,481,384 | 11/1984 | Matthews | 179/18 DA |
| 4,484,025 | 11/1984 | Ostermann et al. | 380/49 |
| 4,581,486 | 4/1986 | Matthews et al. | 179/18 B |
| 4,596,985 | 6/1986 | Bongard et al. | 340/825.69 |
| 4,602,129 | 7/1986 | Matthew et al. | 179/18 B |
| 4,623,919 | 11/1986 | Welch | 358/118 |
| 4,626,845 | 12/1986 | Ley | 340/825.48 |
| 4,654,481 | 3/1987 | Corris et al. | 379/62 |
| 4,691,355 | 9/1987 | Wirstrom et al. | 380/25 |

FOREIGN PATENT DOCUMENTS

0147837A2 7/1985 United Kingdom .
2120821B 8/1985 United Kingdom .

Primary Examiner—Salvatore Cangialosi
Attorney, Agent, or Firm—Thomas G. Berry

[57] ABSTRACT

Subscriber units operating within a communication system are selectively addressed and required to solve a "Puzzle" generated by a central device (controller) of a two-way communication system. The "Puzzle" comprises one or more digital words and an operand, which provides instructions to the subscriber unit as to how to generate an answer. The subscriber units cannot anticipate either the occurrence nor the content of a particular "Puzzle". All subscriber units (both authorized and unauthorized) must return an answer to the "Puzzle" or they may be denied access to the two-way communication system. Also, unauthorized subscriber units may be detected when the central device receives multiple answers to a "Puzzle".

50 Claims, 4 Drawing Sheets

METHOD AND APPARATUS FOR CONTROLLING ACCESS TO A COMMUNICATION SYSTEM

TECHNICAL FIELD

This invention relates generally to two-way communication systems, and more specifically to access control of such systems, and is more particularly directed toward a subscriber authorization procedure to gain access to a two-way communication system.

BACKGROUND ART

Password controlled systems are known. In such systems, access to a resource (such as a central computer) is denied unless a predetermined code (password) is initially provided.

In a two-way communication system, subscribers each have an identification (ID) code, which may be analogized to a simple password control mechanism. Whenever a subscriber desires to communicate, a request (which includes the ID code) may be transmitted to a central location. If the subscriber is authorized (i.e., the ID code is recognized by the system) communication is permitted. Unauthorized (unrecognized) subscribers are denied access to the communication resources. For example, operators of Specialized Mobile Radio (SMR) systems provide a communication service to their subscribers in return for a basic monthly rate (which may also include a variable charge depending upon the amount of "air time" used by each subscriber). Each subscriber is billed for each ID code that the system is programmed to recognize. Generally, each subscriber has unlimited access to the SMR system so long as the service bills are paid.

The need for the present invention grew out of the realization by some SMR operators that some of the subscribers are duplicating (or permitting others to duplicate) the memory device that contains the ID code, and installing the duplicated devices in several radios. In this way, the basic monthly fee per unit is avoided since several subscribers now have the "same" ID code. The loss of revenue to the SMR operators is both significant and growing. Although legal recourse may be available, it is both time consuming and costly. Typically, the SMR operator has invested hundreds of thousands of dollars to provide the communication service, and the additional cost and burden of policing the system may be intolerable.

From the above discussion, it will be apparent that conventional password systems are completely unsuited to address this problem. The fundamental problem with simple password systems is that they presuppose that a subscriber desires to maintain the password in secrecy, thereby assisting in the effort to control who has access to the resource. Accordingly, the addition of a separate password (perhaps entered on a keypad of a radio) would be fruitless since this password could be easily disseminated by those who currently duplicate the ID codes. Further, requiring individuals to enter a password prior to requesting a communication channel goes against the custom and practice of the communication industry, and may be overly burdensome to the subscribers. Thus, a need exists to provide a method for allowing easy access to a communication system, while still providing protection to the operators of such communication systems.

SUMMARY OF THE INVENTION

Accordingly, it is an object of the present invention to provide an improved communication system.

It is another object of the present invention to provide a method for detecting subscriber units having duplicated ID codes.

It is a further object of the present invention to provide a method for denying access to communication services to subscriber units having duplicated ID codes.

Accordingly, these and other objects are achieved in the present method for controlling access to a communication system.

Briefly, according to the invention, selected subscribers are addressed and required to solve a "Puzzle" generated by a central device (controller) of a two-way communication system. The "Puzzle" comprises one or more digital words and an operand, which provides instructions to the subscriber unit as to how to generate an answer. The subscriber units cannot anticipate either the occurrence nor the content of any particular "Puzzle". All subscribers (both authorized and unauthorized) must return an "Answer" to the "Puzzle" or they may be denied access to the two-way communication system. Also, unauthorized subscriber units may be detected when the central device receives multiple answers to a "Puzzle".

DETAILED DESCRIPTION OF THE PREFERRED EMBODIMENT

The goal of the present invention is to detect the presence of subscriber units containing an unauthorized (duplicated) identification (ID) code, which may be used to gain access to a two-way communication system. According to the principles of the present invention, the two-way communication system could comprise virtually any communication system in which information flows both from a central location to subscriber units, and from subscriber units back to the central location. Such systems include, but are not limited to, trunked communication systems, cellular telephone communication systems, wireline computer systems, and the like. In achieving this goal, it is paramount that the present invention afford some protection to ensure against the possibility of "false detection". That is, the present invention must guard against the possibility of designating an authorized subscriber unit as one that has obtained a duplicate ID code, and thus is operating (or attempting to operate) on a communication system in an unauthorized manner.

Since a primary focus of the present invention is to protect the interest of the communication system operator, the action taken upon the detection of an unauthorized subscriber unit is left largely in the hands of the communication service provider. Accordingly, upon detection of an unauthorized subscriber, the ID code that has been duplicated may be denied future access to the communication services. Alternately, a list of any ID codes that have been determined to be unauthorized may be generated. This alternative action provides the system operator with the flexibility to determine whether or not to withhold communication services from a subscriber having an unauthorized ID code, or to take some other action.

Fundamentally, the present invention achieves its goals and objects by having a subscriber unit solve a "Puzzle" and return an "Answer" to the central station or controller. As used herein, a subscriber unit describes portable units, mobile units and control stations. Typically, portable units are designed to be carried on or about the person, mobile units are generally designed to be installed in vehicles, and control stations comprise permanent or semi-permanent installations in buildings or other fixed locations. The "Puzzle" comprises one or more digital codes and an operand code, which provides instructions as to how the subscriber unit may determine the correct answer to the "Puzzle". If the subscriber unit correctly solves the "Puzzle", that subscriber may be permitted to have access to the communication system for some time interval.

Preferably, the operand code of the "Puzzle" comprises one or more logic operation typically performed by microprocessors. Typical operand codes are listed for illustration in Table 1 below.

TABLE 1

Shift Left M-Bits (0 fill in)
Shift Right M-Bits (0 fill in)
Shift Left M-Bits (1 fill in)
Shift Right M-Bits (1 fill in)
Shift Right M-Bits (MSB fill in)
Rotate Right M-bits (without carry bit)
Rotate Left M-bits (without carry bit)
Rotate Right M-bits (with carry bit)
Rotate Left M-bits (with carry bit)
AND Digital Codes
OR Digital Codes
EX-OR Digital Codes
Add Digital Codes
Subtract Digital Codes
Multiply Digital Codes
Divide Digital Codes
Complement (invert)

According to the present invention, a subscriber unit may be commanded to solve a "Puzzle" either on a periodic basis, or upon requesting access to the communication system. If the periodic "Puzzle" solution is required, it may be possible for an unauthorized subscriber to gain access to the communication system for some time period (i.e., until commanded to solve a "Puzzle"). Thus, the present invention operates to permit unauthorized subscribers to have some access to the communication system, preferring to wait until one or more of the unauthorized subscribers transmits an "Answer" to the "Puzzle", which may cause detection of their presence within the communication system. Depending upon how often a particular subscriber unit was commanded to solve a "Puzzle", the period of time required for unauthorized subscribers to detected may be as short as 1 hour, or as long as 1 week. In any event, the present invention prefers a more gradual (yet certain) detection of unauthorized subscribers rather than a more ruthless (and error prone) detection mechanism.

Figure 1A:
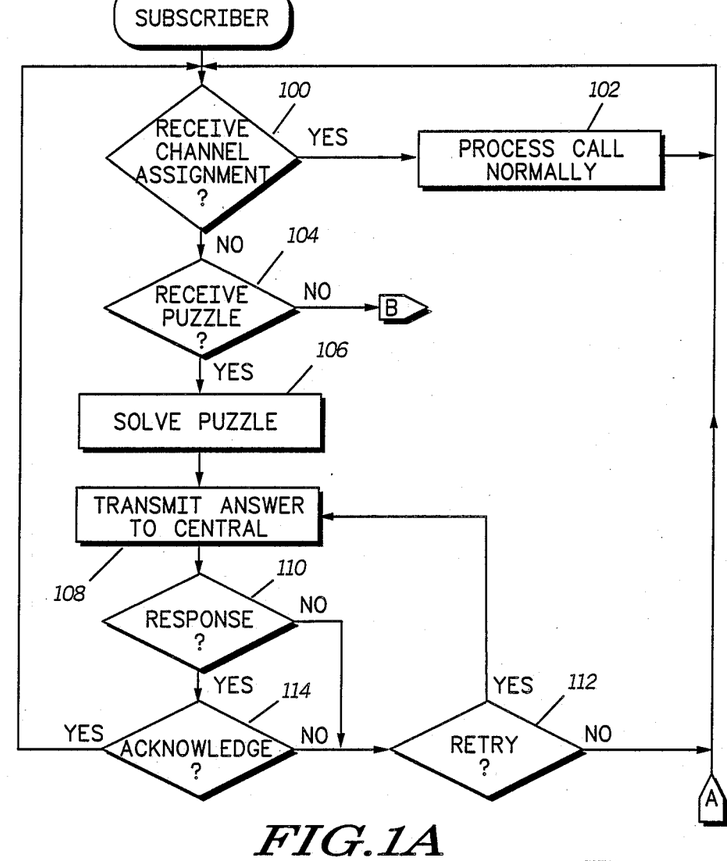
FIGS. 1a and 1b are flow diagrams illustrating the steps executed by a subscriber unit according to the present invention.
Figures 1B, 3B:
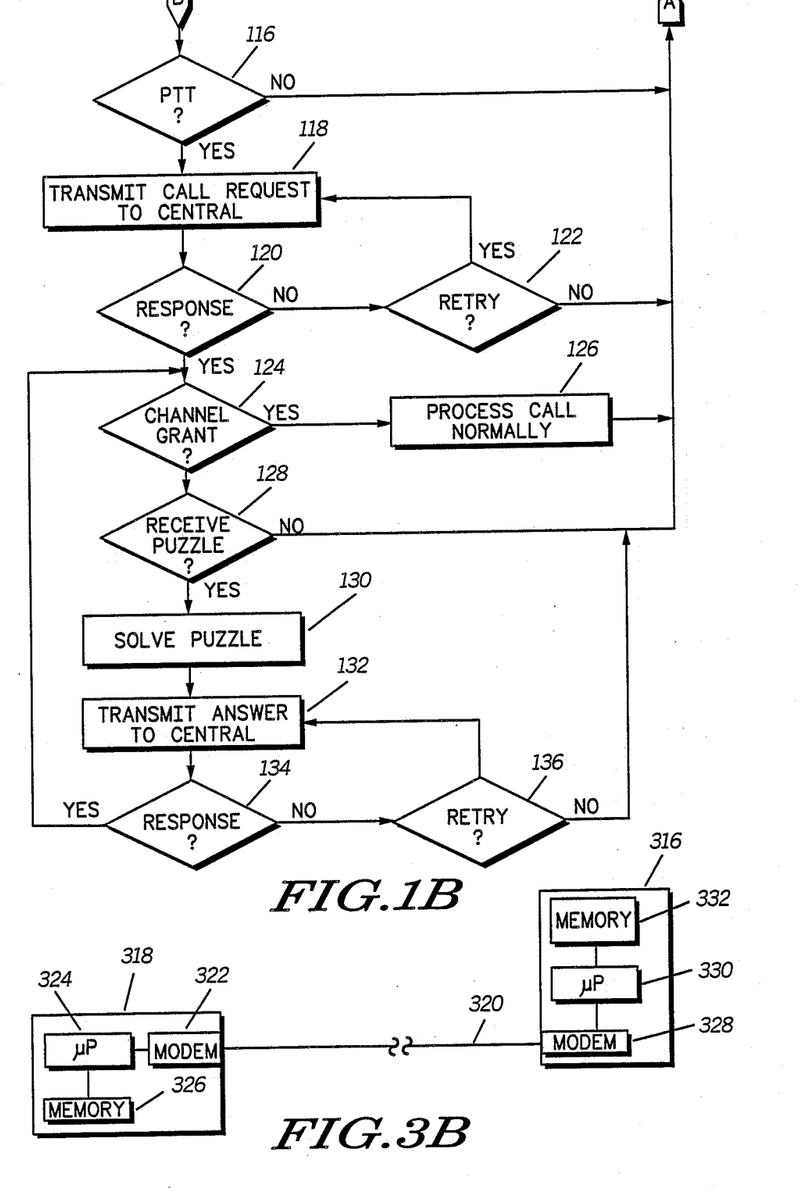
FIG. 3b is an exemplary wireline embodiment of the present invention.

Referring now to FIGS. 1a and 1b, the steps executed by a subscriber unit according to the present invention are shown. Decision 100 determines whether the subscriber unit has received a channel assignment. Normally, decision 100 would return an affirmative response if another subscriber had requested and been granted a channel to communicate with one or more other subscriber units. Thus, if the determination of decision 100 is that a channel assignment has been received, the routine proceeds to step 102, where the call is processed normally. Thereafter, the routine returns to reference letter A.

If, however, the determination of decision 100 is that a channel assignment has not been received, the routine proceeds to decision 104, which determines whether a "Puzzle" has been received from the central unit. If a "Puzzle" has not been received, the routine proceeds to reference letter B of FIG. 1b. Conversely, if a "Puzzle" has been received, the subscriber unit operates (in step 106) to solve the "Puzzle". Preferably a "Puzzle" may be solved by operating upon the one or more digital codes in accordance with the instruction(s) of the operand code(s) to determine or generate an "Answer" code. Thus, for example, a subscriber may receive a first digital code representing the number "2"; a second digital code representing the number "3"; and an operand code instructing the subscriber unit to add the two numbers thereby deriving an "Answer" code of "5". Alternately, a "Puzzle" may consist of a single digital code and operand, which the subscriber unit solves by operating solely upon the single digital code, or by operating upon the received digital code(s) and one or more digital code(s) already stored within the subscriber unit (such as, for example, the subscriber unit's identification code). More fundamentally, the subscriber unit may operate upon one or more digital codes stored within the subscriber unit, and/or the received digital code(s), in accordance with the operand code(s) to derive an index code, which may be used to access a table of "Puzzle" answers or their equivalents.

Once the subscriber has solved the "Puzzle", the routine proceeds to step 108, where the subscriber unit transmits an "Answer" code to the central unit. Following this, the subscriber waits for a response from the central (decision 110). If decision 110 determines that a response has not been received after a suitable time interval, the routine proceeds to decision 112, where the subscriber unit determines whether to retry the transmission (step 108). Ordinarily, a subscriber unit will retry a transmission several times after waiting a predetermined time interval for a response from the central. If the determination of decision 112 is that the subscriber should not retransmit the "Answer", the routine proceeds to reference letter A.

When the subscriber receives a response from the central, decision 114 determines whether an "Acknowledge" code has been received. The "Acknowledge" code signifies that the subscriber has correctly solved the "Puzzle", and may have access to the communication facilities at his or her request. If an "Acknowledge" code has not been received, decision 112 again determines whether to retry (step 108) the transmission or to exit the routine to reference letter A.

Referring now to FIG. 1b, the subscriber routine continues in decision 116, which determines whether or not the subscriber has activated the push-to-talk (PTT) switch to initiate a transmission. If not, the routine proceeds to reference letter A of FIG. 1a. However, if the determination of decision 116 is that the subscriber has activated the PTT switch, the routine proceeds to step 118, where a "Call Request" code is transmitted to the central in an attempt to gain access to the communication facilities. Decision 120 determines whether the central has responded to the subscriber's "Call Request". If not, the request may be retried (step 118) in accordance with decision 122. After receiving a response, decision 124 determines whether or not the subscriber's "Call Request" has been answered with a "Channel Grant" code. If a "Channel Grant" has been received, the call is handled normally in step 126. However, if a "Channel Grant" has not been received, the routine proceeds to step 128, which determines whether a "Puzzle" has been returned in response to the "Call Request". If so, the routine proceeds to step 130, where the subscriber unit solves the "Puzzle" in a manner similar to that described above in conjunction with step 106. After solving the "Puzzle", the routine proceeds to step 132, where the "Answer" is transmitted to the central.

Decision 134 determines whether the central has responded. If there is no response within a predetermined time interval, the "Answer" transmission may be retried (step 132) according to decision 136. If a response has been received, decision 134 routes control to reference letter C (and decision 124), which determines whether a "Channel Grant" has been received. Thus, in the "Call Request" context, a "Channel Grant" comprises the "Acknowledge" code indicating that the subscriber unit has correctly solved the "Puzzle".

Figure 2A:
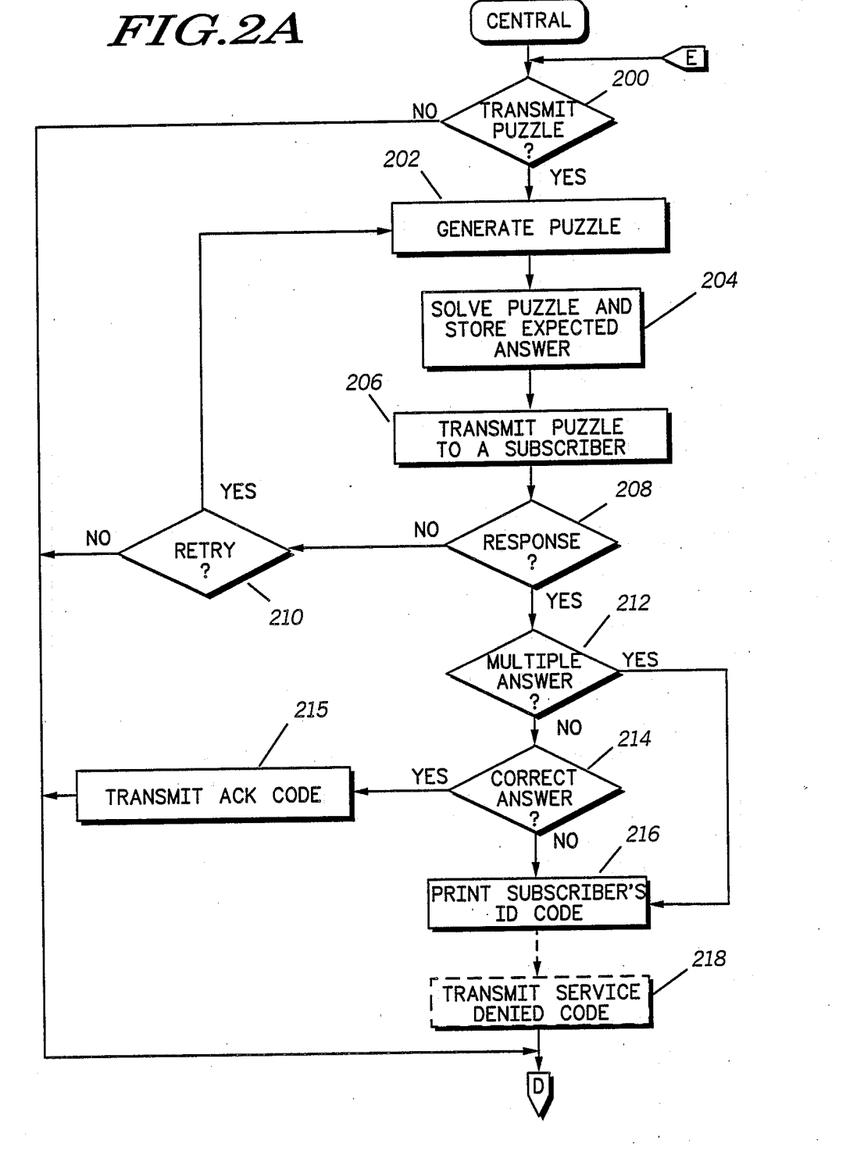
FIGS. 2a and 2b are flow diagrams illustrating the steps executed by a central unit of a two-way communication system according to the present invention.
Figure 2B:
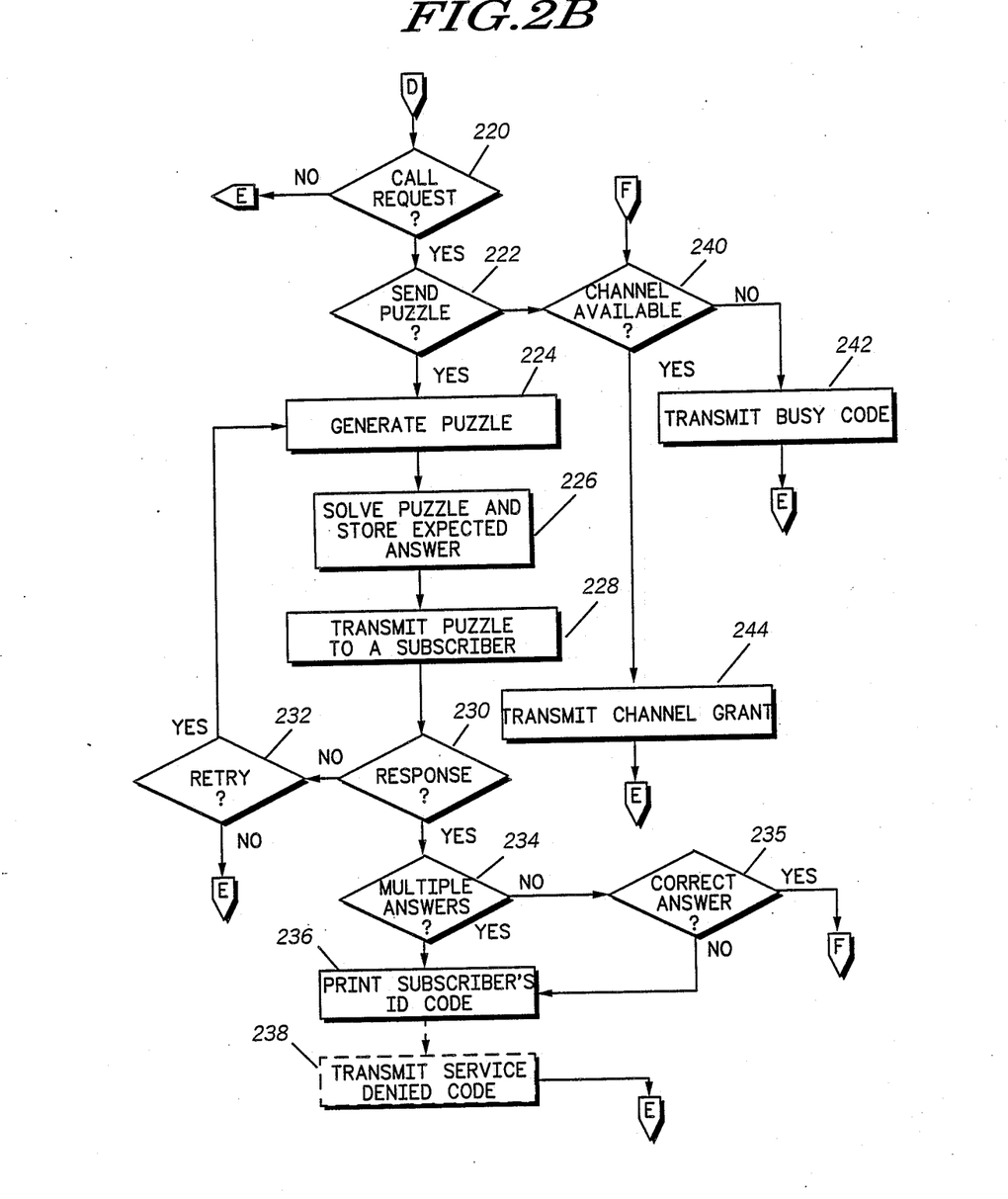

Referring now to FIGS. 2a and 2b, the steps executed by a central unit of a two-way communication system according to the present invention are shown. Decision 200 determines whether to transmit a "Puzzle" to a subscriber unit. According to the present invention, a selected subset of a total number of subscribers may be periodically selected by the system operator to be required to solve a "Puzzle". Optionally, a computer or other control device may select at random a sub-set of subscriber units from the plurality of subscriber units that will be required to solve the "Puzzle". If no subscriber units are to be required to solve a "Puzzle" (without initiating a "Call Request"), the routine proceeds to reference letter D. However, if the determination of decision 200 is that a "Puzzle" should be transmitted to a subscriber unit, the routine proceeds to step 202, where a "Puzzle" is generated. According to the principles of the present invention, the central generates one or more digital codes and randomly selects one or more of the operands from a set of available operands (Table 1) that a subscriber unit may be required to use. Next, the central solves the "Puzzle" (step 204) and stores an expected "Answer" cross-referenced to the identification code of the subscriber unit that will receive the "Puzzle". To solve the "Puzzle", the central controller preferably performs the same steps the subscriber unit will perform to solve the "Puzzle". Thus, the central operates on the one or more digital codes in accordance with the one or more operands to arrive at an "Answer". Alternately, if the central "knows" (i.e., has stored therein) the predetermined code(s) stored within the subscriber unit, the random digital code(s) and operand(s) may be operated upon together with the "known" (stored) predetermined code(s) to derive the expected "Answer". In any event, the central stores the expected "Answer" (step 204) to the "Puzzle" and the routine proceeds to step 206, where the "Puzzle" is transmitted to a particular subscriber unit identification code.

Decision 208 determines whether the subscriber unit has responded. If not, the routine proceeds to decision 210, which determines whether to re-contact the subscriber unit. If so, the routine proceeds to step 202, where an entirely new "Puzzle" is generated. That is, the subscriber unit is given only one chance to solve any given "Puzzle". If no response is received, the subscriber may be recontacted, but will be required to solve a new "Puzzle". If the subscriber unit has responded, decision 212 determines whether the central has received multiple "Answer" codes within a predetermined time interval. If several subscribers are operating with the "same" ID code (i.e., unauthorized (duplicated) ID codes) the central may receive several "Answer" codes to the same "Puzzle". However, since it is customary for the subscriber units to retransmit (retry) the "Answer" to a nonresponding central (see FIG. 1a decision 212, and step 108) it is paramount that the central must not incorrectly determine a retry response as a unauthorized subscriber's response.

Accordingly, the central may determine how many "Answer" codes it receives within a predetermined time interval, that is shorter in duration than the retry timers of the subscriber units. That is, if the central receives a plurality of "Answer" codes before a valid retry could have been sent, the central may be assured that there are subscriber units having duplicated ID codes operating within the system. If multiple "Answer" codes were received (decision 212) or the subscriber unit incorrectly solved the "Puzzle" (decision 214), step 216 prints the subscriber's ID code on either the system operators CRT screen or on a line printer (or equivalent) so that a record may be generated to inform the system operator which subscribers have duplicated ID codes. Optionally, the routine may proceed to step 218 and transmit a "Service Denied" code to the unauthorized subscriber unit, thereby locking that subscriber unit out of the two-way communication system.

Assuming only one "Answer" code was received, decision 214 determines whether the received "Answer" is correct by correlating (comparing) the received "Answer" to the expected "Answer". If the subscriber has correctly answered the "Puzzle", the routine proceeds to step 215 where the central transmits an "Acknowledge" code.

Referring now to FIG. 2b, the central routine continues in decision 220, which determines whether a "Call Request" has been received from a subscriber unit. If a "Call Request" has not been received, the routine proceeds to reference letter E of FIG. 2a. If the determination of decision 220 is that a "Call Request" has been received, the routine proceeds to decision 222, which determines whether a "Puzzle" should be transmitted to the requesting subscriber unit. If so, step 224 generates a "Puzzle" under the same criteria as previously discussed in conjunction with step 202. The "Puzzle" may be solved, and the expected "Answer" stored, in step 226, in a similar manner to that discussed above in conjunction with step 204. Next, the "Puzzle" is transmitted to the subscriber in step 228, and the routine proceeds to decision 230, which determines whether a response has been received from the subscriber unit. If, after a predetermined time interval, no response has been received from the subscriber unit, the routine proceeds to decision 232, which determines whether to recontact the subscriber unit. If an affirmative determination results from decision 232, a new "Puzzle" is generated (step 224) and transmitted to the subscriber.

Again, a subscriber has only one chance to answer any particular "Puzzle". If a response has been received, decision 234 determines whether multiple "Answer" codes to the "Puzzle" has been received before a subscriber unit could validly have retransmitted an "Answer". If not, decision 235 determines whether the single received "Answer" is correct by comparing (correlating) the received "Answer" to the expected "Answer". If multiple "Answer" codes have been received, or the single received "Answer" is incorrect, the routine proceeds to step 236, where the subscriber's identification code is printed on the system operator's CRT panel or a line printer. Optionally, the central may transmit (step 238) a "Service Denied" code to the subscriber unit.

Assuming that decision 235 determines that the single received is correct, or that the determination of decision 222 was that a "Puzzle" should not be sent, the routine proceeds to reference letter F (decision 240), which determines if a channel is available for the subscriber unit to communicate on. If not, a "Busy" code is transmitted to the subscriber (step 242). If, however, a channel is available, the routine proceeds to step 244, where a "Channel Grant" is transmitted to the subscribers so that the call may be processed normally.

Figure 3A:
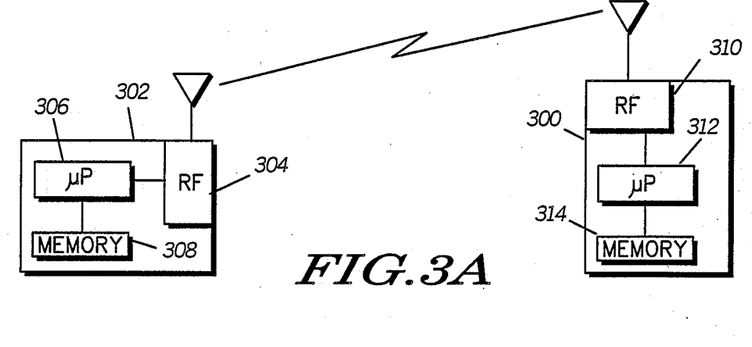
FIG. 3a is an exemplary wireless (radio) embodiment of the present invention.

Referring now to FIG. 3a, the wireless (radio) embodiment of the present invention is illustrated. A central unit 300 (having a radio frequency (RF) transceiver 310, a microprocessor 312 and a memory 314) may communicate over a wireless channel to a subscriber 302 (having a RF transceiving device 304, a microprocessor 306 and a memory 308).

Referring now to FIG. 3b, a wireline embodiment of the present invention is illustrated where a central unit 316 comprises a modem (or line driver and receiver) coupled to a microprocessor 330 and a memory 332. The central 316 communicates via a wireline channel 320 with a subscriber unit 318, which comprises a modem 322, a microprocessor 324 and a memory 326.

In either of the embodiments of FIG. 3a or 3b, the "Puzzle" is solved by the logical operations of the microprocessor (308 or 326) operating alone or in cooperation with predetermine numbers stored in its memory (306 or 324). In this way, a subscriber unit may be addressed and commanded to solve a "Puzzle", and return an "Answer" code to the central location, which may in turn determine if the subscriber has correctly solved the "Puzzle", and whether multiple (unauthorized) subscribers are presently operating under the same identification code.

What is claimed is:

1. In a two-way communication system having:
a central unit; and
a plurality of subscriber units each having at least an identification code stored therein;
a method of controlling access to the two-way communication system comprising the steps of:
at at least one of said plurality of subscriber units:
(a) receiving a puzzle comprising:
(i) at least one digital code;
(ii) at least one operand code representing at least instructions for processing said at least one digital code;
(b) solving said puzzle to provide an answer code representing at least a solution to said puzzle;
(c) transmitting at least said answer code.

2. The method of claim 1, which includes the further step of: (d) receiving a acknowledge code.

3. The method of claim 1, wherein said step of solving comprises operating upon said at least one digital code in accordance with said at least one operand code to provide said answer code.

4. The method of claim 1, wherein said step of solving comprises:
(b1) operating upon said at least one digital code in accordance with said at least one operand code to provide an index code;
(b2) accessing a memory in accordance with said index code to retrieve said answer code.

5. The method of claim 1, wherein said step of solving comprises operating upon said at least one digital code and at least one predetermined digital code stored within said subscriber unit in accordance with said at least one operand code to provide said answer code.

6. The method of claim 1, wherein said step of solving comprises:
(b1) operating upon said at least one digital code and at least one predetermined digital code stored within said subscriber unit in accordance with said at least one operand code to provide an index code;
(b2) accessing a memory in accordance with said index code to retrieve said answer code.

7. In a two-way communication system having:
a central unit; and
a plurality of subscriber units each having at least an identification code stored therein;
a method of controlling access to the two-way communication system comprising the steps of:
at at least one of said plurality of subscriber units:
(a) transmitting a code representing a request to communicate;
(b) receiving a puzzle comprising:
(i) at least two digital codes;
(ii) at least one operand code representing at least instructions for processing said at least two digital codes;
(c) solving said puzzle to provide an answer code representing at least a solution to said puzzle;
(d) transmitting at least said answer code.

8. The method of claim 7, which includes the further step of: (e) receiving a channel grant code.

9. The method of claim 7, wherein said step of solving comprises operating upon at least one of said at least two digital codes in accordance with said at least one operand code to provide said answer code.

10. The method of claim 7, wherein said step of solving comprises:
(b1) operating upon at least one of said at least two digital codes in accordance with said at least one operand code to provide an index code;
(b2) accessing a memory in accordance with said index code to retrieve said answer code.

11. The method of claim 7, wherein said step of solving comprises operating upon at least one of said at least two digital codes and at least one predetermined digital code stored within said subscriber unit in accordance with said at least one operand code to provide said answer code.

12. The method of claim 7, wherein said step of solving comprises:
(b1) operating upon at least one of said at least two digital codes and at least one predetermined digital code stored within said subscriber unit in accordance with said at least one operand code to provide an index code;

(b2) accessing a memory in accordance with said index code to retrieve said answer code.

13. In a two-way communication system having
a central unit; and
a plurality of subscriber units each having at least an identification code stored therein;
a method of controlling access to the two-way communication system comprising the steps of:
at at least one of said plurality of subscriber units:
 (a) receiving a puzzle comprising:
  (i) at least one digital code;
  (ii) at least one operand code representing at least instructions for processing said at least one digital code;
 (b) solving said puzzle to provide an answer code representing at least a solution to said puzzle;
 (c) transmitting at least said answer code
at said central unit:
 (a) generating said puzzle;
 (b) solving said puzzle to provide an expected answer code;
 (c) transmitting said puzzle;
 (d) receiving said answer code to provide a received answer code;
 (e) comparing said received answer code and said expected answer code.

14. The method of claim 13, wherein said central unit generating step comprises:
 (a1) generating at least one random digital code;
 (a2) selecting at least one operand code from a set of available operand codes.

15. The method of claim 13, wherein said central unit generating step comprises:
 (a1) selecting at least one digital code from a set of available digital codes;
 (a2) selecting at least one operand code from a set of available operand codes.

16. The method of claim 13, wherein said central unit step of solving comprises operating upon said at least one digital code in accordance with said at least one operand code to provide said expected answer code.

17. The method of claim 13, wherein said central unit step of solving comprises operating upon said at least one digital code and at least one predetermined digital code stored within said subscriber unit in accordance with said at least one operand code to provide said expected answer code.

18. The method of claim 13, wherein said subscriber unit step of solving comprises operating upon said at least one digital code in accordance with said at least one operand code to provide said answer code.

19. The method of claim 13, wherein said subscriber unit step of solving comprises:
 (b1) operating upon said at least one digital code in accordance with said at least one operand code to provide an index code;
 (b2) accessing a memory in accordance with said index code to retrieve said answer code.

20. The method of claim 13, wherein said subscriber unit step of solving comprises operating upon said at least one digital code and at least one predetermined digital code stored within said subscriber unit in accordance with said at least one operand code to provide said answer code.

21. The method of claim 13, wherein said subscriber unit step of solving comprises:
 (b1) operating upon said at least one digital code and at least one predetermined digital code stored within said subscriber unit in accordance with said at least one operand code to provide an index code;
 (b2) accessing a memory in accordance with said index code to retrieve said answer code.

22. In a two-way communication system having:
a central unit; and
a plurality of subscriber units each having at least an identification code stored therein;
a method of controlling access to the two-way communication system comprising the steps of:
at at least one of said plurality of subscriber units:
 (a) transmitting a code representing a request to communicate;
 (b) receiving a puzzle comprising:
  (i) at least one digital code;
  (ii) at least one operand code representing at least instructions for processing said at least one digital code;
 (c) solving said puzzle to provide an answer code representing at least a solution to said puzzle;
 (d) transmitting at least said answer code
at said central unit:
 (a) receiving said code representing a request to communicate;
 (b) generating said puzzle;
 (c) solving said puzzle to provide an expected answer code;
 (d) transmitting said puzzle;
 (e) receiving said answer code to provide a received answer code;
 (f) comparing said received answer code and said expected answer code.

23. The method of claim 22, wherein said central unit generating step comprises:
 (a1) generating at least one random digital code;
 (a2) selecting at least one operand code from a set of available operand codes.

24. The method of claim 22, wherein said central unit generating step comprises:
 (a1) selecting at least one digital code from a set of available digital codes;
 (a2) selecting at least one operand code from a set of available operand codes.

25. The method of claim 22, wherein said central unit step of solving comprises operating upon said at least one digital code in accordance with said at least one operand code to provide said answer code.

26. The method of claim 22, wherein said central unit step of solving comprises operating upon said at least one digital code and at least one predetermined digital code stored within said subscriber unit in accordance with said at least one operand code to provide said answer code.

27. The method of claim 22, wherein said subscriber unit step of solving comprises operating upon said at least one digital code in accordance with said at least one operand code to provide said answer code.

28. The method of claim 22, wherein said subscriber unit step of solving comprises:
 (b1) operating upon said at least one digital code in accordance with said at least one operand code to provide an index code;
 (b2) accessing a memory in accordance with said index code to retrieve said answer code.

29. The method of claim 22, wherein said subscriber unit step of solving comprises operating upon said at least one digital code and at least one predetermined digital code stored within said subscriber unit in accordance with said at least one operand code to provide said answer code.

30. The method of claim 22, wherein said subscriber unit step of solving comprises:
(b1) operating upon said at least one digital code and at least one predetermined digital code stored within said subscriber unit in accordance with said at least one operand code to provide an index code;
(b2) accessing a memory in accordance with said index code to retrieve said answer code.

31. In a two-way communication system having:
a central unit; and
a plurality of subscriber units each having at least an identification code stored therein;
a method of controlling access to the two-way communication system comprising the steps of:
at at least one of said plurality of subscriber units:
 (a) receiving a puzzle comprising:
  (i) at least one digital code;
  (ii) at least one operand code representing at least instructions for processing said at least one digital code;
 (b) solving said puzzle to provide an answer code representing at least a solution to said puzzle;
 (c) transmitting at least said answer code
at said central unit:
 (a) generating said puzzle;
 (b) solving said puzzle to provide an expected answer code;
 (c) transmitting said puzzle;
 (d) receiving said answer code to provide a received answer code;
 (e) determining whether more that one answer codes are received during a time interval.

32. The method of claim 31, which includes the further central unit step of: (g) determining, if only one answer code is received, whether said at least one received answer code correlates to said expected answer code.

33. The method of claim 32, which includes the further central unit step of: (h) transmitting a communication grant code if said at least one received answer code correlates to said expected answer code.

34. The method of claim 31, which includes the further central unit step of: (g) determining, if more that one answer code is received, whether said at least one received answer code is associated with the same subscriber identification code.

35. The method of claim 34, which includes the further central unit step of: (h) printing said subscriber identification code if at least two of said at least one received answer code is associated with the same subscriber identification code.

36. The method of claim 34, which includes the further central unit step of: (h) transmitting a service denied code to a subscriber unit identified by said subscriber identification code if at least two of said at least one received answer code is associated with the same subscriber identification code.

37. The method of claim 34, which includes the further central unit step of: (h) storing said subscriber identification code if at least two of said at least one received answer code is associated with the same subscriber identification code.

38. In a two-way communication system having:
a central unit; and
a plurality of subscriber units each having at least an identification code stored therein;
a method of controlling access to the two-way communication system comprising the steps of:
at at least one of said plurality of subscriber units:
 (a) transmitting a code representing a request to communicate;
 (b) receiving a puzzle comprising:
  (i) at least one digital code;
  (ii) at least one operand code representing at least instructions for processing said at least one digital code;
 (c) solving said puzzle to provide an answer code representing at least a solution to said puzzle;
 (d) transmitting at least said answer code
at said central unit:
 (a) receiving said code representing a request to communicate;
 (b) generating said puzzle;
 (c) solving said puzzle to provide an expected answer code;
 (d) transmitting said puzzle;
 (e) determining how many answer codes are received during a time interval.

39. The method of claim 38, which includes the further central unit step of: (f) determining, if only one answer code is received, whether said received answer code correlates to said expected answer code.

40. The method of claim 39, which includes the further central unit step of: (g) transmitting a communication grant code if said received answer code correlates to said expected answer code.

41. The method of claim 38, which includes the further central unit step of: (f) determining, if more that one answer code is received, whether at least two received answer codes are associated with the same subscriber identification code.

42. The method of claim 41, which includes the further central unit step of: (g) printing said subscriber identification code if at least two received answer codes are associated with the same subscriber identification code.

43. The method of claim 41, which includes the further central unit step of: (g) transmitting a service denied code to a subscriber unit identified by said subscriber identification code if at least two received answer codes are associated with the same subscriber identification code.

44. The method of claim 41, which includes the further central unit step of: (g) storing said subscriber identification code if at least two received answer codes are associated with the same subscriber identification code.

45. A communication unit, comprising:
 (a) receiving means for receiving a puzzle comprising:
  (i) at least one digital code;
  (ii) at least one operand code representing at least instructions for processing said at least one digital code;
 (b) processing means for solving said puzzle to provide an answer code representing at least a solution to said puzzle; and
 (c) transmitting means for transmitting at least said answer code.

46. The subscriber unit of claim 45, wherein said receiving means comprises a radio frequency receiving means.

47. The subscriber unit of claim 45, wherein said processing means comprises a microprocessor.

48. The subscriber unit of claim 45, wherein said transmitting means comprises a radio frequency transmitting means.

49. The subscriber unit of claim 45, which includes means of requesting access to the two-way communication system.

50. A two-way communication system, comprising:
at least one subscriber unit, comprising:
- (a) receiving means for receiving a puzzle comprising:
  - (i) at least one digital code;
  - (ii) at least one operand code representing at least instructions for processing said at least one digital code;
- (b) processing means for solving said puzzle to provide an answer code representing at least a solution to said puzzle;
- (c) transmitting means for transmitting at least said answer code at least one central unit, comprising:
- (a) means for generating said puzzle;
- (b) processing means for solving said puzzle to provide an expected answer code;
- (c) transmitting means for transmitting said puzzle;
- (d) receiving means for receiving said answer code to provide a received answer code;
- (e) means for comparing said received answer code and said expected answer code.

* * * * *